United States Patent
Robert et al.

(10) Patent No.: US 12,008,479 B2
(45) Date of Patent: Jun. 11, 2024

(54) AUTOMATIC DETERMINATION OF THE RUN PARAMETERS FOR A SOFTWARE APPLICATION ON AN INFORMATION PROCESSING PLATFORM BY GENETIC ALGORITHM AND ENHANCED NOISE MANAGEMENT

(71) Applicant: BULL SAS, Les Clayes-sous-bois (FR)

(72) Inventors: Sophie Robert, Les Adrets (FR); Gaël Goret, La Murette (FR); Soraya Zertal, Sceaux (FR)

(73) Assignee: BULL SAS, Les Clayes-sous-Bois (FR)

( * ) Notice: Subject to any disclaimer, the term of this patent is extended or adjusted under 35 U.S.C. 154(b) by 262 days.

(21) Appl. No.: 16/912,802

(22) Filed: Jun. 26, 2020

(65) Prior Publication Data

US 2020/0410366 A1 Dec. 31, 2020

(30) Foreign Application Priority Data

Jun. 28, 2019 (FR) ...................................... 1907135

(51) Int. Cl.
*G06F 17/18* (2006.01)
*G06N 3/126* (2023.01)
*G06N 7/01* (2023.01)
*G11B 20/18* (2006.01)

(52) U.S. Cl.
CPC ................................... *G06N 3/126* (2013.01)

(58) Field of Classification Search
CPC ............... G06N 3/126; G06F 16/2477; G06Q 10/06316
See application file for complete search history.

(56) References Cited

U.S. PATENT DOCUMENTS

| | | | | |
|---|---|---|---|---|
| 9,311,959 B1* | 4/2016 | Fan | ......................... | G11B 20/18 |
| 10,650,265 B1* | 5/2020 | Price | ...................... | G06V 20/20 |
| 10,943,583 B1* | 3/2021 | Gandhe | ................. | G10L 15/183 |
| 2003/0140023 A1* | 7/2003 | Ferguson | ............... | G06Q 30/02 |
| | | | | 706/15 |
| 2012/0227043 A1* | 9/2012 | Johansson | ............... | G06F 17/18 |
| | | | | 718/100 |

(Continued)

OTHER PUBLICATIONS

Search Report issued in European Patent Application No. 20 18 2708 dated Oct. 20, 2020.

(Continued)

*Primary Examiner* — Brandon S Cole
(74) *Attorney, Agent, or Firm* — MEAGHER EMANUEL LAKS GOLDBERG & LIAO LLP

(57) ABSTRACT

A method for optimizing the run parameters of a software application on an information processing platform, consisting of iteratively optimizing said parameters on each execution of said application, wherein, for each execution of said application (11),
a set of said parameters is determined and a run time of said application with said parameters is determined, and an association between said set and said run time is stored in order to create a history (25); and wherein said set is determined by implementing a genetic optimization algorithm comprising a step (21) consisting of selecting two sets of parameters from said history; a step (22) consisting of creating a new set of parameters by recombining said two sets of parameters; and a step (23) of random mutation of said new set of parameters.

4 Claims, 1 Drawing Sheet

(56) References Cited

U.S. PATENT DOCUMENTS

2015/0356485 A1* 12/2015 Aggour ............ G06Q 10/06316
    705/7.26
2018/0300737 A1* 10/2018 Bledsoe .............. G06F 16/2477

OTHER PUBLICATIONS

Vincent et al., "Self-optimization Strategy for IO Accelerator Parameterization", High Performance Computing, Jan. 25, 2019, Lecture Notes in Computer Science (LNCS, vol. 11203), Springer International Publishing, pp. 157-170.

* cited by examiner

[Fig. 1]
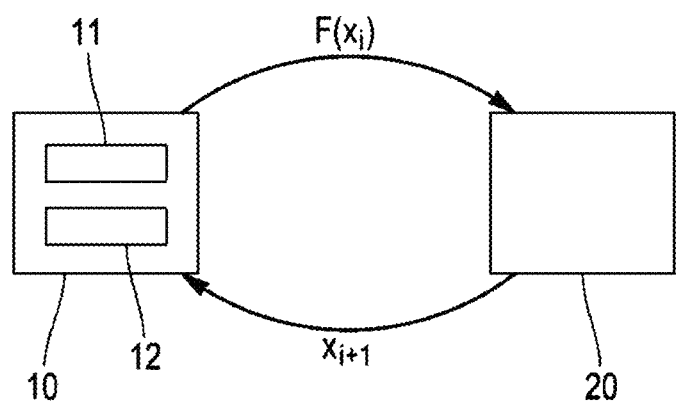
[Fig. 2]
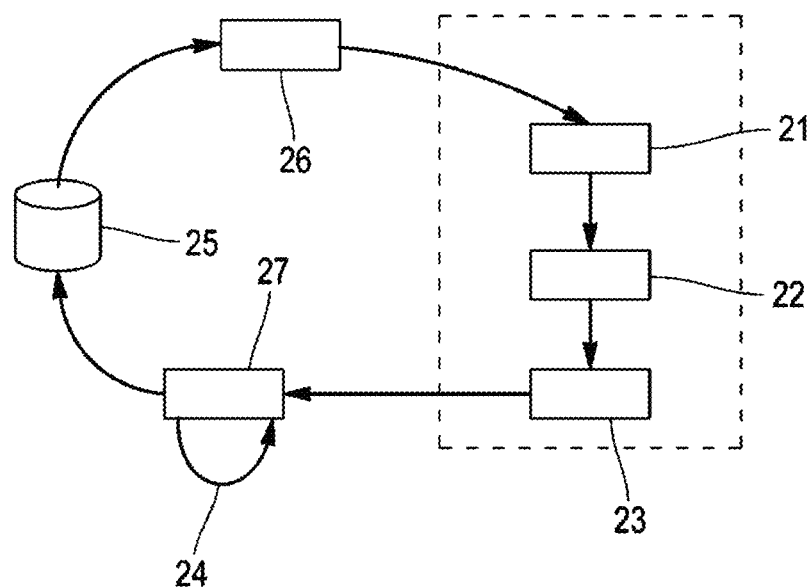

AUTOMATIC DETERMINATION OF THE RUN PARAMETERS FOR A SOFTWARE APPLICATION ON AN INFORMATION PROCESSING PLATFORM BY GENETIC ALGORITHM AND ENHANCED NOISE MANAGEMENT

CROSS-REFERENCE TO RELATED APPLICATIONS

This application claims the benefit of French Patent Application No. 1907135 filed Jun. 28, 2019, the disclosure of which is herein incorporated by reference in its entirety.

FIELD OF THE INVENTION

The invention relates to the field of optimizing the run time of software applications on information processing platforms.

It applies particularly well to the field of high performance computing and supercomputers, in particular their evolution toward "exascale" computing.

CONTEXT OF THE INVENTION

The changes in size and increasing complexity of today's information processing platforms already imply a paradigm shift in their use and in their administration. Indeed, increasingly, human intervention is proving difficult given the quantity of information involved in maintaining an optimal operating state.

In addition, future exascale computers, i.e., targeting power in the order of an exaFLOP, will integrate a much higher number of calculation nodes, and the current methods of accessing data of POSIX parallel file systems, involving strong data consistency and having fairly limited scaling, will no longer be usable.

Alternative solutions exist. Some are looking to extend the POSIX model: mention can in particular be made of burst buffer technologies, as described in N. Liu, J. Cope, P. Cams, C. Carothers, R. Ross, G. Grider, A Crume and C. Maltzahn. "On the Role of Burst Buffers in Leadership-Class Storage Systems", in IEEE 28th Symposium on Mass Storage Systems and Technologies (MSST), 2012, Other solutions propose other access models, such as object-based storage, described for example in M. Mesnier, G. R. Ganger, and E. Riedel. "Object-based storage", in IEEE Communications Magazine, 41(8):84-90, 2003, or DAOS, described for example in Breitenfeld, M. Scot, et al. "DAOS for Extreme-scale Systems in Scientific Applications", in arXiv preprint arXiv:1712.00423, 2017

However, these alternative solutions imply implementation on demand, with specific parameters adapted to the behavior of the applications for which they will be instantiated. The state of the art today is that this parameter setting is entirely manual, and the responsibility of users who very rarely have the skills to define it.

Therefore, for this automation to be possible, it will be essential to have a very deep understanding of the behavior of the applications in order to apply the most relevant input/output acceleration strategies, and thus participate in optimizing the functioning of the supercomputer.

In addition, the immense size of the parameter space and their interconnectedness with the run context make full parameter setting too time-consuming to be a viable solution.

SUMMARY OF THE INVENTION

The purpose of this invention is to provide a method and a system that at least partially overcome the aforementioned drawbacks.

In particular, the invention makes it possible to abstract from all knowledge about the applications and their behaviors, and not to depend on preconceptions about the data to be considered. Given the applications to be considered can be highly diverse in their behavior, it can indeed be extremely complicated to model their particular behavior. The invention thus implements a "black box"-type mechanism, and thus proposes greater ease of use and a broader field of application.

More particularly, the invention aims to provide an optimization of the execution of software applications which is automated, i.e., which minimizes, or even makes non-essential, human intervention in the parameter setting of the execution of the application.

To this end, this invention proposes a method for optimizing the run parameters of a software application on an information processing platform, consisting of iteratively optimizing said parameters on each execution of said application, wherein, for each execution of said application,
 a set of said parameters is determined and a run time of said application with said parameters is determined, and an association between said set and said run time is stored in order to create a history; and wherein
 said set is determined by implementing a genetic optimization algorithm comprising a step consisting of selecting two sets of parameters from said history; a step consisting of creating a new set of parameters by recombining said two sets of parameters; and a step of random mutation of said new set of parameters.

According to preferred embodiments, the invention comprises one or more of the following features, which may be used separately or in partial combination with one another, or in full combination with one another:
 a plurality of executions of said application are carried out with the same set of parameters, and a run time is determined based on said plurality of executions for said set of parameters;
 said set of parameters is the new set of parameters determined by the step of random mutation;
 the run time determined is the average value of the run times for said plurality of executions;
 the method further entails a step of smoothing by regression of the run times as a function of the sets of parameters stored in said history;

Another aspect of the invention relates to a device for optimizing the run parameters of a software application on an information processing platform, consisting of iteratively optimizing said parameters on each execution of said application, wherein, for each execution of said application, said device being configured to
 determine a set of said parameters, determine a run time of said application with said parameters, and an association between said set and said run time is stored in order to create a history; and wherein
 determine said set by implementing a genetic optimization algorithm by selecting two sets of parameters from said history; creating a new set of parameters by recombining said two sets of parameters; and performing a random mutation of said new set of parameters.

According to preferred embodiments, the device according to the invention comprises one or more of the following features, which may be used separately or in partial combination with one another or in full combination with one another:

The device further comprises means for performing a plurality of executions of said application using the same set of parameters, and determining a run time as a function of said plurality of executions for said set of parameters;

said set of parameters is the new set of parameters determined at the end of said random mutation;

the run time determined is the average value of the run times for said plurality of executions;

the device further comprises means of smoothing by regression of the run times as a function of the sets of parameters stored in said history.

Another aspect of the invention relates to a computer program comprising software means suitable for implementing the method as described above, when triggered by an information processing platform.

An additional benefit of the invention is that of providing a solution making it possible to operate in real time, i.e., to be triggered to optimize any new request for executing an application, by taking advantage of the history, without requiring additional processing delaying this execution. The method according to the invention can thus operate online. The invention can also be used in order to build a history, or to infer from an existing history in order to provide better responses during the next request to run an application.

Other characteristics and benefits of the invention will become apparent upon reading the following description of a preferred embodiment of the invention, given as an example with reference to the attached drawings.

BRIEF DESCRIPTION OF THE DRAWINGS

FIG. 1 schematically illustrates a context in which an embodiment of the invention is likely to be implemented.

FIG. 2 schematically and functionally represents the optimization loop according to an embodiment of the invention.

DETAILED DESCRIPTION OF THE INVENTION

The invention aims to minimize the run time of a high performance application (i.e., "HPC"). To do this, the problem involves finding the optimal set of run parameters allowing for this minimum run time.

In the following, "job" or "work" will be used to refer to an abstract representation consisting of a set of metadata, which define the methods of execution of an application on an information processing platform. In particular, these metadata comprise:

an identifier of the application (name of the executable binary file, information coming from the application run tool on a supercomputer, accessed files, etc.);

the hardware topology used (calculation and storage);

parameters for the run context, and, in particular, the parameters for optimizing the input-output interfaces associated with this software application.

As previously mentioned, the invention makes it possible to abstract from all knowledge about the applications and their behaviors, and not to depend on preconceptions about the data to be considered.

Given the applications to be considered can be highly diverse in their behavior, it can indeed be extremely complicated to model their particular behavior. The invention thus aims to implement a mechanism in which the application to be executed ("job") is considered to be a "black box".

In computer science, a "black box" is a system or an object that can only be considered in terms of inputs and outputs, without knowledge of its internal behavior. This concept is clearly understood by those skilled in the art.

Reference can also be made to the Wikipedia page: https://en.wikipedia.org/wiki/Black_box The invention thus allows greater ease of use and can be implemented for a broader range of applications.

It appears that high performance computing (HPC) applications devote a significant part of their run time to performing inputs/outputs. The volumes of data processed represent in themselves the main cause: since the networks used to exchange data have a finite bandwidth, the read and write times cannot be less than the theoretical minima.

It is beneficial to focus more particularly on input/output performance when it comes to high performance applications.

The inventors deem that "black-box" type methods are very interesting for providing solutions to the general problem of optimizing the run parameters (therefore the input/output parameters, in particular) for high performance applications.

Different approaches have been studied, including simulated annealing, substitution models, genetic algorithms, etc.

It has been observed experimentally during several in-depth studies that genetic algorithms exhibited the best behavior among the approaches studied when they were used in an iterative self-optimization loop, according to several well-defined criteria.

However, in general, the black-box optimization approaches are based on the preconception that the phenomenon to be optimized is deterministic, i.e., that two executions (or "runs") of the same application (same application, same run parameter) would correspond to identical performance measurements (run time, etc.).

However, a fortiori, in the context of high performance applications, this is not the case. Indeed, for a given "job", two executions (or "runs") will result in different behaviors, which can be linked to concurrent access to data, to the use of processing resources by other application runs, etc.

Consequently, the invention is based on a genetic algorithm, but adapted to take into account this stochastic, or noisy, nature of the data to be processed.

FIG. 1 highly schematically illustrates an architecture comprising at least one processor according to one embodiment of the invention. A set 10 of runs of application 11 is considered according to a set of run parameters. This set of run parameters can be associated with tool 12 of the "burst buffer" type.

Each run is monitored in order to collect a measurement for a performance indicator, such as a run time, and supply it to an optimization module 20.

Application 11 is run several times to allow incremental optimization of the run parameters.

$x_i$ stands for the set of run parameters for running index i of application 11. $f(x_i)$ stands for the intrinsic run time of application 11 with the parameter setting $x_i$. Hereinafter, "parameter setting" will refer to the set of run parameters (with their value), used for an execution of application 11.

However, as we have seen, there is noise linked to phenomena external to the application (concurrent access, etc.), which means that the actual run time does not solely depend on the set of parameters. This "external" contribution may be seen as a noise $\varepsilon(x_i)$, which may depend on parameters $x_i$ (it is indeed conceivable that certain phenomena may be more or less significant depending on certain run parameters).

Consequently, the performance measurement $F(x_i)$ received by optimization module 20 superimposes the intrinsic run time and this noise:

$$F(xi)=f(xi)+\varepsilon(xi) \qquad \text{[Math. 1]}$$

The problem can then be formulated as the minimization of the expectation of the function $F(x_i)$ on the set of possible parameter settings $x_i$, i.e., the search for the parameter settings that return, on average, the minimum run time.

According to one aspect of the invention, optimization module 20 implements a genetic algorithm.

Genetic algorithms are a type of evolutionary algorithm that aims to mimic natural selection. The following Wikipedia page provides a rather complete, albeit high-level, description thereof, but, in any case, one that is sufficient for understanding the invention: https://en.wikipedia.org/wiki/Genetic_algorithm Typically, a genetic algorithm can be broken down into three phases: a selection phase, a recombination phase (or "cross-over") and a mutation phase.

The algorithm takes the form of an iterative process starting from a first set of parameter settings, for which a run time is available. Throughout the algorithm, this set of parameter settings will be improved, as illustrated in FIG. 2.

FIG. 2 illustrates the steps making it possible to optimize the run parameters of a software application, according to an embodiment of the invention. These steps can be implemented by optimization module 20 in cooperation with application 11 (step 24). The figure clearly shows the iterative nature of the process, which consists of a self-optimization loop: the optimization solution is approached iteratively. It is understood that the more executions of the application are provided, the better the optimization provided by optimization module 20 can be.

In this example of FIG. 2, the genetic algorithm consists of steps of selection 21, replication or recombination (or "crossing over") 22 and mutation 23.

During a step 21, at each iteration, two parameter settings are selected from the set of parameter settings known to be recombined (like two chromosomes) in order to form a new parameter setting during the next step of recombination 22.

Different paradigms can be used for the selection of a pair of parameter settings. In general, the aim is to select two parameter settings associated with good performance measurements (inverse of the run time), according to the principle that, at each iteration, the "good" data of the sample being considered is favored and the "bad" data is discarded.

The selection methods can be those of the state of the art in the field. Examples of selection methods comprise:

Rank selection: This selection technique always chooses the parameter settings with the best run times, so chance does not come into play in this method. In fact, if n parameter settings constitute the population, the selection applied consists of keeping the k best parameter settings according to a probability which depends on the rank (and not on the run time).

Fitness proportionate selection: Also called "roulette" or "wheel of fortune" selection, for each parameter setting, the probability of being selected is proportional to its performance measurement (i.e., the inverse of its run time). To select a parameter setting, the principle of the biased wheel of fortune is used. This wheel is a classic wheel of fortune on which each parameter setting is represented by a portion proportional to its performance measurement. A homogeneous random draw is then made using this wheel.

Tournament selection: This technique uses proportional selection on pairs of parameter settings, then chooses, from these pairs, the parameter setting that has the best performance measurement (i.e., the shortest run time).

Uniform selection: The selection is made randomly, uniformly and without contribution from the performance measurement. Each parameter setting therefore has a probability 1/P of being selected, where P is the total number of parameter settings in the population.

In a step 22, these two selected parameter settings (called "parents") are recombined to create a new one therefrom, called "child". This new parameter setting is therefore composed of two parts, each coming from one of the two parent parameter settings.

Different recombination methodologies can be used.

According to a first example, each parameter setting is arbitrarily divided into two parts in the same way. Note that $\{p_{1,1}, p_{1,2} \ldots p_{1,N}\}$ is the set of N parameters of the $P_1$ parameter setting, and $\{p_{2,1}, p_{2,2} \ldots p_{2,N}\}$ is the set of N parameters of the $P_2$ parameter setting. A number i is randomly drawn between 1 and N, and each $P_1$ $P_2$ parameter setting is divided into two parts on either side of this index. The following is then obtained, respectively: $\{p_{1,1}, p_{1,2} \ldots p_{1,i}\}$, $\{p_{1,i+1}, p_{1,N}\}$ and $\{p_{2,1}, p_{2,2} \ldots p_{2,i}\}$, $\{p_{2,i+1}, \ldots p_{2,N}\}$. These parts are combined to form a new parameter setting. For example, this may be a new parameter setting consisting of the first part of the $P_1$ parameter setting and the second part of the $P_2$ parameter setting: $\{p_{1,1}, p_{1,2} \ldots p_{1,i}, p_{2,i+1}, \ldots p_{2,N}\}$.

A second example is called n-point recombination. This involves cutting the parent parameter settings into n parts and forming the child parameter settings by concatenating the parts that come, alternately, from each parent.

The next step is mutation step 23. This step consists of randomly deciding whether a modification, which is also random, should be made to the child parameter setting resulting from the recombination step. This step makes it possible to explore new possibilities for parameter settings and to avoid blockages in the local minima of the function to be optimized (the run time).

Different methodologies are possible for carrying out this mutation. In particular, it is possible to perform a random walk by modifying one of the parameters, chosen randomly, to a neighboring value in the space of values covered by this parameter.

Thus, the selection step makes it possible to utilize existing knowledge about the links between parametric space and run time, while the mutation step makes it possible to explore new possibilities in order to improve the good convergence in the iterative optimization process.

The new parameter setting is then evaluated by running the application in step 27. Its run time can then be stored in a history memory 25, in association with this new parameter setting. History 25 is thus expanded with a new data "point".

Initially, genetic algorithms were developed to answer problems of optimization for deterministic functions. Nevertheless, tests have shown that they could also apply to the optimization of stochastic (or noisy) functions, and nonetheless allow convergence toward an optimum.

According to one embodiment, mechanisms are added to this genetic algorithm, making it possible to further improve the performance of the iterative optimization process in the noisy context of optimizing the run time of a high performance application.

Several mechanisms can be implemented. According to one embodiment, these can be grouped into two categories:
- a first family 24 of methods consists of re-sampling certain parameter settings;
- a second family 26 of methods consists of performing an approximation of the function giving the run time as a function of the parameter setting, in particular by regression, in order to increase the volume of data that can be utilized by the genetic algorithm.

These two families of methods can be implemented independently of one another, and other families of methods can also be implemented, in place of or in addition to these.

Thus, according to a first embodiment, a method of the first family 24 is implemented. According to a second embodiment, a method from the second family 26 of methods is implemented. According to a third embodiment, both a method of the first family and a method of the second family are implemented.

A first family 24 of methods consists of re-sampling a given parameter setting. The term "re-sampling" is understood here to mean a re-evaluation of the application run time several times on the basis of this same parameter setting.

Thus, by re-evaluating several times the same function F(x) giving the run time as a function of the parameter setting, the influence of the noise can be minimized and a better understanding of the influence of the parameter setting on the run time can be obtained. A plurality of executions of the application with this same parameter setting are therefore carried out.

Thus, it is possible to estimate run time f(x) and function f at "point" x, by evaluation $\overline{F}(x)$ provided by the following equation, in which n is the number of evaluation for the same parameter setting x, and which returns an average value on this sample n:

$$\overline{F}(x) = \frac{1}{n}\sum_{i=1}^{n} F(x) \qquad \text{[Math. 2]}$$

There are several possible strategies for selecting the parameter setting that is to be re-evaluated.

When in a real-time operating mode, i.e., when it comes to dynamically processing the executions of the application, the parameter setting to be re-evaluated is the current parameter setting, i.e., the one resulting from the genetic algorithm.

In other situations, it is possible to envision re-evaluating other parameter settings among those in the run history.

Mention may be made of two simple and effective examples of strategies. These two strategies are based on the assumption that noise $\varepsilon(x_i)$ is based on a Gaussian law N(0, $\sigma(x)$), where $\sigma(x)$ represents the variance. Thus, the standard error of the mean for parameter x, which corresponds to the standard deviation of the mean estimator $\overline{F}(x)$ is equal to $$\frac{\sigma(x)}{\sqrt{n}}.$$

Since the value of $\sigma(x)$ is unknown, it can only be estimated by an unbiased estimator $\hat{\sigma}(x)$ given by the following equation:

$$\hat{\sigma}(x) = \sqrt{\frac{1}{n-1}\sum_{i=1}^{n}(F(x) - \overline{F}(x))} \qquad \text{[Math. 3]}$$

A first strategy then consists of calculating the run time several times for the parameter setting x selected, regardless of its value.

A second strategy consists of making the number of times that the run time is measured for the same parameter setting depend on a noise estimate for this parameter setting. This estimate can be based on the standard error. At each iteration, the recalculated standard error can be compared with a predefined threshold, and the re-sampling loop can be ended when the standard error becomes less than the threshold.

These two strategies require fixing parameters, such as the number n of iterations of the re-sampling loop and the threshold for the stopping criterion.

According to an embodiment of the invention, these parameters are fixed by an original method, comprising the estimation of the average $\hat{\mu}$ and the variance $\hat{\sigma}$ on the initialization points of the genetic algorithm, and by fixing the standard error se from the average threshold to a certain percentage p of the estimated average: se=p×$\hat{\mu}$ In the case of a simple re-sampling (first strategy described above), since $$se = \frac{\sigma}{\sqrt{n}}. \qquad \text{[Math. 4]}$$

The following can be fixed $$n = \frac{\widehat{\sigma^2}}{p^2 \times \hat{\mu}^2} \qquad \text{[Math. 5]}$$

A second family 26 of methods for improving the performance of the iterative optimization process in the noisy context of optimizing the run time of a high performance application consists of performing an approximation of the function giving the run time, depending on the parameter setting, in particular by regression.

Regression makes it possible to use the already determined points, which therefore associate a run time with a parameter setting to estimate the run time for each possible parameter setting, and to thus allow a smoothing of the values obtained, in a "raw" manner, in the previous steps. Thus, the "raw" value can be replaced by a value representing an estimate based on the run time values obtained for other parameter settings.

There are different ways to perform this regression.

In particular, different parts of the history can be used for the regression. The entire history (i.e., all parameter settings already evaluated) or a neighborhood of the parameter settings to be estimated can be used to perform this regression. One of the advantages of local regression is that the assumption made about regression on the function giving the run time only needs to be correct locally.

If $N_x$ is a neighborhood of parameter setting x and $g_{Nx}$ is a regressor trained in this neighborhood, function f(x) can be estimated using the expression:

$$f(x) = g\_Nx(x) \qquad \text{[Math. 6]}$$

Several regression techniques can be used. In particular, mention may be made of the weighted average and the Gaussian regression process (or Kriging regression).

Regression thus makes it possible to increase the quantity of data that can be utilized by the genetic algorithm to make selections 21 from two parameter settings.

Thus, the iteration loop 21-26 makes it possible to refine the knowledge of the behavior of the application based on its possible parameter settings. Steps 21-23 make it possible to explore new parameter settings and converge, iteratively, toward settings providing better solutions, i.e., shorter run times.

Steps 24 and 26 make it possible to improve the robustness of the overall process regarding the noise created by the vagaries of running an application on a processing platform.

The invention claimed is:

1. A computer-implemented method for optimizing run parameters of a software application on an information processing platform to optimize run time of said software application, said run time being the time spent by said software application to execute, said computer-implemented method consisting of iteratively optimizing said run parameters on each execution of said software application, wherein said computer-implemented method comprises, for each execution of said software application, determining, by at least one processor, a set of said run parameters and a run time of said software application with said set of run parameters;

storing, by said at least one processor, an association between said set of run parameters and said run time in a run history, said run history being stored in a memory and comprising already determined sets of run parameters and associated run times; and applying a regression function to the run times stored in said run history in association with said already determined set of run parameters, by said at least one processor, so as to estimate the run time, as a function of the sets of parameters, for each possible set of run parameters, and to allow a smoothing of the estimated run times;

wherein said determining comprises determining said set of run parameters, by said at least one processor, by implementing a genetic optimization algorithm comprising:

selecting two sets of run parameters from said run history;

creating a new set of run parameters by recombining said two sets of run parameters; and creating a random mutation of said new set of run parameters, to get a mutated new set of run parameters, and wherein said determined set of run parameters is the mutated new set of run parameters got by said random mutation;

wherein said computer-implemented method comprises evaluating said determined set of run parameters by executing said software application, and wherein said executing comprises carrying out a plurality of executions of said software application with said same determined set of run parameters, and said run time is determined based on said plurality of executions for said determined set of run parameters, and wherein said computer-implemented method comprises, in a real-time operating mode, receiving a new request for executing said software application, inferring from said run history a set of run parameters that minimizes the run time and executing said software application with said inferred set of run parameters in response to said new request.

2. The computer-implemented method according to claim 1, wherein the run time determined is the average value of the run times for said plurality of executions.

3. A device for optimizing run parameters of a software application on an information processing platform to optimize run time of said software application, said run time being the time spent by said software application to run, consisting of iteratively optimizing said run parameters on each execution of said software application, wherein, said device comprises at least one processor and for each execution of said software application, said device being configured to:

determine a set of said run parameters, determine a run time of said software application with said run parameters, and store an association between said set of run parameters and said run time is stored in a run history, said run history being stored in a memory and comprising already determined associations between sets of run parameters and run times;

apply a regression function to the run times stored in said run history, so as to estimate the run time, as a function of the sets of parameters, for each possible set of run parameters, and to allow a smoothing of the estimated run times;

determine said set by implementing a genetic optimization algorithm by selecting two sets of run parameters from said run history; creating a new set of run parameters by recombining said two sets of run parameters; and performing a random mutation of said new set of parameters to get a mutated new set of run parameters, said set of run parameters being said mutated new set of run parameters determined by said random mutation; and evaluate said set of run parameters by performing a plurality of executions of said software application using said same set of run parameters, and determine said run time as a function of said plurality of executions for said set of run parameters; and wherein said device is further configured, in a real-time operating mode, to receive of a new request for executing said software application, infer from said run history a set of run parameters that minimizes the run time, and execute said software application with said inferred set of run parameters in response to said new request.

4. The device according to claim 3, wherein the determined run time is the average value of the run times for said plurality of executions.

\* \* \* \* \*